United States Patent [19]

vom Dorp

[11] 4,080,716
[45] Mar. 28, 1978

[54] METHOD FOR CONTROLLING PROPER CLAMPING OF A WORKPIECE IN A CLAMPING DEVICE

[75] Inventor: Heinz vom Dorp, Monchen-Gladbach

[73] Assignee: Wilhelm Hegenscheidt Gesellschaft mbH, Erkelenz, Germany

[21] Appl. No.: 790,299

[22] Filed: Apr. 25, 1977

[51] Int. Cl.² ............................................. B23Q 3/08
[52] U.S. Cl. ........................................ 29/559; 279/4; 269/20
[58] Field of Search .................... 29/407, 559; 269/20; 279/4

[56] References Cited
U.S. PATENT DOCUMENTS

| | | | |
|---|---|---|---|
| 2,542,318 | 2/1951 | Faverty et al. | 408/13 |
| 3,814,449 | 6/1974 | Buck | 279/4 X |
| 3,924,514 | 12/1975 | Parsons et al. | 279/4 X |

Primary Examiner—Milton S. Mehr
Attorney, Agent, or Firm—Michael J. Striker

[57] ABSTRACT

A method for controlling proper clamping of a workpiece in a clamping device, the clamping jaws of which are moved to a clamping position by movement of a piston of hydraulically operated cylinder-and-piston means in a clamping direction, in which a control signal is produced indicating proper clamping of the workpiece when sensing means cooperating with the piston indicate that the latter, during its movement in clamping direction, has reached at least a first position but not reached a second position spaced in clamping direction from the first position, while at the same time a predetermined pressure acting in clamping direction on the piston is indicated.

6 Claims, 3 Drawing Figures

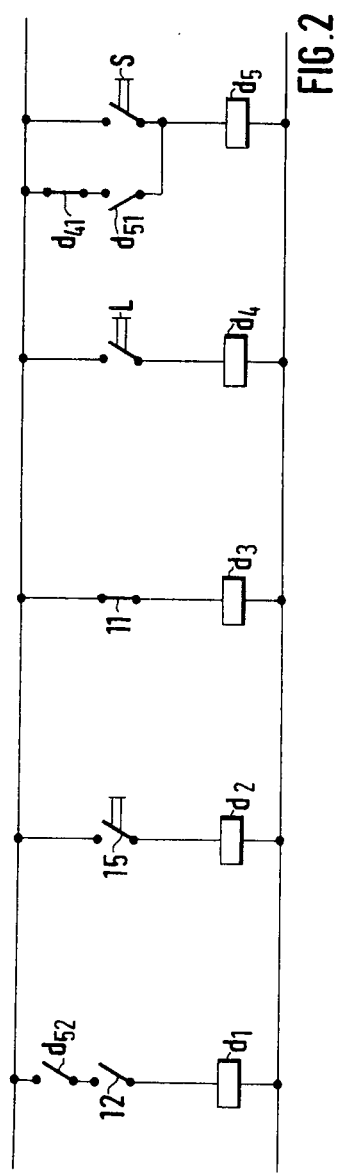
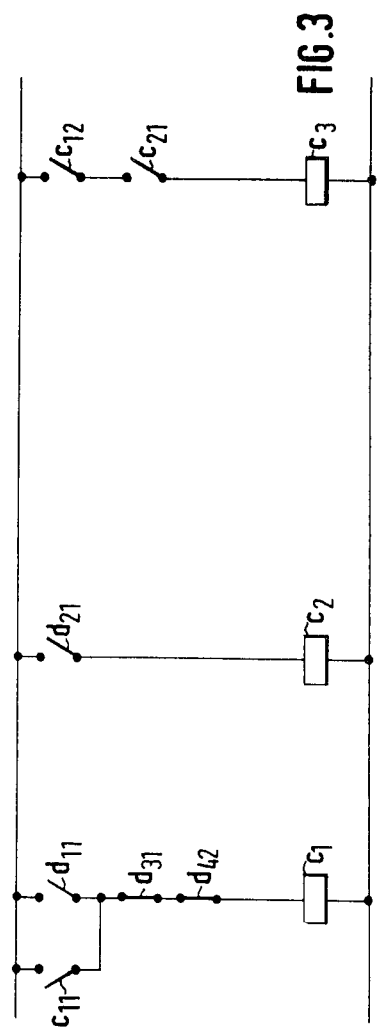

METHOD FOR CONTROLLING PROPER CLAMPING OF A WORKPIECE IN A CLAMPING DEVICE

BACKGROUND OF THE INVENTION

It is known in the art to use power operated heavy-duty chucks in machine tools of all kinds to clamp a workpiece to be machined. Such chucks are operated by hydraulically or pneumatically operated cylinder-and-piston means which are of known construction and connected to the clamping jaws of the chuck. The problem inherent during use of such power operated chucks consists in that it cannot be ascertained with sufficient certainty whether the workpiece to be machined is actually properly clamped after the chuck is operated. It could, for instance, happen that in view of diameter differences of various workpieces, the stroke of the piston in the clamping cylinder, and therewith that of the clamping jaws in clamping direction, reaches its end before the workpiece is properly clampled.

Furthermore, it could for instance happen, that after proper clamping of the workpiece, the conduit for feeding pressure fluid into the clamping cylinder becomes defective so that the workpiece would not be properly clamped any longer. In both cases the machine tool could start, respectively continue the operation with a non-properly clamped workpiece. In such a case the workpiece could be thrown out of the machine tool, which could lead to injury of the operator or damage of the machine tool.

In order to overcome these shortcomings it has already been suggested in the German Pat. No. DDR-PS 39001 to prevent sudden pressure loss, for instance due to defective pressure fluid conduits, by arranging in close vicinity to the clamping cylinder a check valve which, during pressure loss in the fluid pressure conduit, closes the cylinder space which is acted upon by the pressure fluid. Such an arrangement can, however, not prevent that, due to leakage losses in the check valve or due to leakage losses in the seal of the piston, the clamping force will gradually diminish, whereby nearly the same disadvantages will occur as by a suddenly diminishing clamping force. In the mentioned patent it has also been suggested to monitor the limits of the effective clamping region of the clamping cylinder by two limit switches. Clear statements as to the function of the two limit switches are, however, not contained in the aforementioned patent. From the illustration in FIG. 1 of this patent can, however, be visualized that one of the limit switches evidently signals the end position of the piston in a tandem cylinder, whereas the other limit switch signals the other end position, apparently in order to assure that the piston in the case of internal or external clamping has not moved to its end position without clamping the workpiece. However, these two limit switches do not afford proper clamping control since, for instance at defective seals of the piston, the clamping jaws may properly abut the workpiece, while the latter is not clamped with the necessary force. Likewise slow pressure drop and corresponding drop of the clamping pressure remains undetected so that the suggested check valve and limit switches in this known construction in their disclosed combination will not assure proper clamping of the workpiece during the machining operation.

The construction disclosed in the aforementioned German patent is modified in the No. DT-AS 1911558 solely in order to obtain shorter clamping cylinders. In this construction, it is likewise suggested to prevent certain pressure loss by the provision of check valves, to transfer the movement of the piston in the clamping cylinder to the exterior of the latter so as to control the piston position outside of the cylinder. From the mentioned DT-AS as well as from the mentioned DDR-PS can, however, not be ascertained in which way the knowledge of the piston position can contribute to an improvement of the clamping control.

Therefore, the above-mentioned shortcomings are inherent in the constructions disclosed in the aforementioned publications.

SUMMARY OF THE INVENTION

It is, therefore, an object of the present invention to provide a method for controlling proper clamping of a workpiece by means of which it can be ascertained with absolute reliability whether a workpiece is actually properly clamped in a power operated clamping device.

With these and other objects in view, which will become apparent as the description proceeds, the method according to the present invention for controlling proper clamping of a workpiece in a clamping device having clamping jaws operatively connected to fluid operated cylinder-and-piston means, the piston of which is to be moved in one direction during clamping of the workpiece, comprises the steps of placing a workpiece between the open clamping jaws, feeding pressure fluid into the cylinder-and-piston means to move the piston thereof in the clamping direction, sensing whether the piston during movement in the clamping direction reaches at least one first piston position but not a second piston position spaced in the clamping direction from the first position, simultaneously sensing the presence of a predetermined fluid pressure acting on the piston, and producing a control signal indicating proper clamping of the workpiece when the piston in its final clamping position has at least reached said first position but not reached said second position while said fluid pressure is present in said clamping position.

If one of the above-mentioned requirements is not accomplished, the control signal will not be produced and the machine tool cannot start, respectively would be stopped when said control signal disappears. A gradual or sudden loss of the clamping pressure cannot produce a damage any longer. Furthermore, in contradistinction to the prevailing practice according to the prior art, the method according to the present invention does not control the upper or lower end position of the clamping piston, but the method according to the present invention ascertains whether the piston, in its clamping position, will be at a definite desired region. In this way it is possible, which is especially important during automatic loading of a machine tool which is provided with power operated clamping devices, that during loading of the workpiece into the clamping device, the clamping jaws may be opened as far as possible, so that the workpiece during the loading need not be exactly placed in a central position into the open clamping device, while during the clamping operation it can be ascertained whether the clamping jaws during their power operation actually move in clamping direction and, for instance during exterior clamping of the workpiece, a predetermined maximum diameter is actually reached and it can be ascertained at the same time whether the likewise predetermined minimum diameter has not been reached. In this way it is also possible, in combination with the already-described pressure control, to avoid also improper clamping of the workpiece due to non-properly adjusted clamping jaws.

According to a further feature of the present invention the reaching of the first piston position is sensed at about half of the total stroke the piston can perform during its movement in clamping direction, and wherein the non-reaching of the second piston position is sensed at a distance from the first position which corresponds to the movement of the clamping jaws equal to half the permissible diameter difference of the workpiece to be clamped. Such a method is especially interesting during machining of small series of workpieces, when the workpiece diameters of the individual series to be machined deviate from each other. This method will positively prevent that workpieces with a wrong diameter are clamped. Of course all other above-mentioned advantages are also maintained with this method.

According to a further feature of the present invention the point of sensing the second position, the piston should not reach during its movement in clamping direction, is spaced a very short distance from an end position the piston may reach in the absence of a workpiece during movement thereof in the clamping direction, and wherein the first piston position is sensed at a distance from the second piston position which corresponds to a movement of the clamping jaws equal to half of the permissible diameter difference of the workpiece to be clamped.

This method is especially advantageous in machine tools having a vertical axis and especially then if heavy workpieces have to be machined. During loading of machine tools with a vertical axis, in which the face plate is constructed as a clamping device, the workpieces are placed in machines with automatically operating loading devices, as well as during manually loading of the workpieces, usually not exactly centrally at the face plate for subsequent clamping and machining of the workpiece. Since according to the last-mentioned way of operation it is desired that the piston at the moment in which the workpiece is properly clamped by the clamping jaws, has already closely approached one end of the cylinder without reaching this end, it is possible to operate during loading of the workpiece with a clamping jaw diameter which is considerably greater than the diameter of the workpiece to be clamped. Thus, the workpiece may be placed in an opening which is considerably greater than the diameter of the workpiece and the clamping jaws will centralize the workpiece automatically during the clamping operation. The other above-mentioned advantages are evidently also derived by this specific operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 2 and 3 illustrate a wiring diagram for the control devices according to the present invention.

DESCRIPTION OF THE PREFERRED EMBODIMENTS

Figure 1:
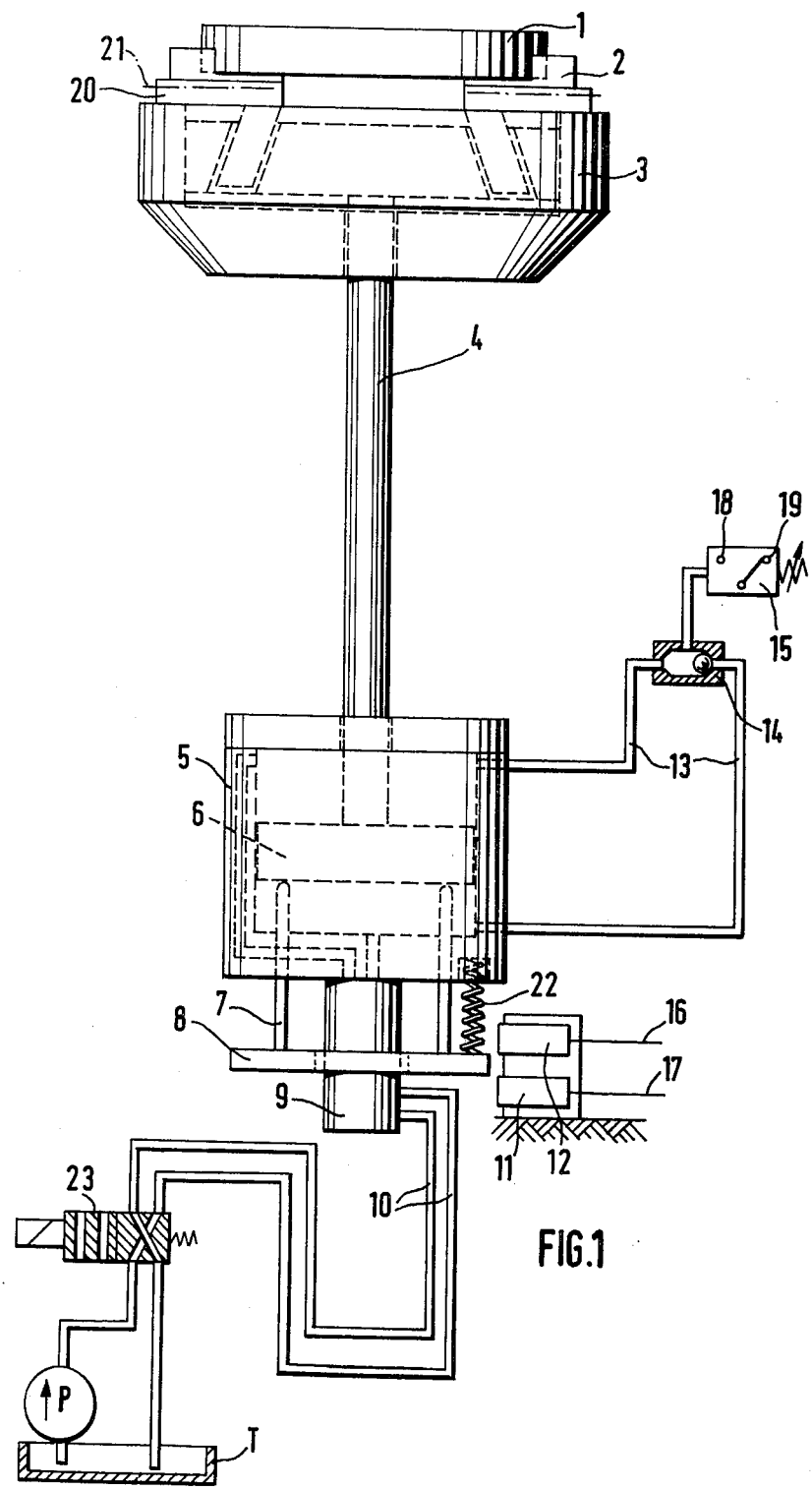
FIG. 1 schematically illustrates a clamping device and cylinder-and-piston means for operating the clamping jaws of the clamping device, as well as the control arrangement according to the present invention.

The method according to the present invention will be described under the assumption that the workpiece 1, shown in FIG. 1, is to be clamped in a machine tool having a vertical axis and that the fact that the workpiece is properly clamped is ascertained and monitored during the machining of the workpiece 1.

Machine tools with a vertical axis are well known in the art as, for instance, disclosed in the U.S. Pat. No. 2,542,318, and FIG. 1 illustrates only the clamping device for clamping a workpiece in such a machine tool, as well as the elements for operating the clamping device and the control elements according to the present invention.

As shown in FIG. 1, the workpiece 1 will be clamped by the clamping jaws 2 of a known, as face plate constructed, clamping device, when the piston rod 4 of a piston 6 in the clamping cylinder 5 is actuated and moved downwardly in the cylinder 5. During such a downward movement of the piston rods 4, the clamping jaws 2 will be moved, as evident from FIG. 1, in radial direction. The clamping jaws 2 are radially adjustable on base jaws 20 mounted in the member 3. Such radial adjustment may, as known, for instance be performed by screw spindles, of which only the center lines 21 are indicated in FIG. 1. In order to assure a proper clamping of the workpiece it is first necessary to adjust the clamping circle diameter of the clamping jaws 2 to the diameter and to the diameter tolerance of the workpiece to be clamped. For this purpose, the base jaws 20 and therewith the clamping jaws 2 are moved by means of the clamping cylinder 5 to the smallest diameter, that is the piston 6 in the clamping cylinder 5 is moved in the direction "clamping", that is downwardly, to its lowermost end position. If the path of the piston during such movement is designated with $x$ and the corresponding movement of the clamping jaws 2 with $y$, then the relationship in power-operated clamping devices between the movement performed by the clamping jaws and that performed by the piston may be expressed $Z = Y : x$.

The smallest permissible diameter $D_1$ and the largest permissible diameter $D_2$ of the workpiece to be clamped are known. Furthermore, a reserve distance of suitable size for the movement of the clamping piston 6 in clamping direction is designated with W.

If the diameter to which the clamping jaws 2 are to be originally adjusted is designated with $D_E$, then the equation $D_E = D_1 - 2WZ$ is obtained.

By means of this equation it is possible to calculate in a simple manner the diameter to which the clamping jaws have to be adjusted. Since the clamping piston 6 during such adjustment of the clamping jaws 2 is located in its lowermost end position, the adjustment of the clamping jaw position can be carried out in a very simple manner.

Subsequently thereto it is necessary to adjust the position of two limit switches 11 and 12.

For this purpose pressure fluid is fed into the clamping cylinder 5 through the conduits 10 and the pressure fluid connection 9 so as to move the piston 6 in downward direction. The position of the piston 6 in the cylinder 5 is indicated by feeler pins 7 engaging with the upper ends thereof the bottom face of the piston 6 and extending fluid-tightly sealed through the bottom wall of the cylinder 5 and being connected at the lower ends thereof to a switch plate 8, guided for movement in vertical direction on the member 9, so as to indicate the position of the piston 6 in the cylinder 5 outside of the latter. The arrangement is made in such a manner that when the piston 6 reaches its lowermost end position in the cylinder 5, the switch plate 8 reaches also its lowermost end position. A tension spring 22, connected at opposite ends to the cylinder 5 and to the switch plate 8, will assure that the switch plate 8 moves also in upward direction during upward movement of the piston 6 in the cylinder 5.

It is now assumed that the piston 6, due to the preceeding diameter adjustment of the clamping jaws 2, is still in its end position in the direction of clamping. In this position the switch plate 8 has also reached its end position in the clamping direction. The position of the limit switch 11 has then to be adjusted in such a manner that its actuating point is located for a distance equal to the chosen reserve distance W relative to the switch plate 8 in releasing direction, that is upwardly thereof. This means that when the switching plate 8 during the clamping stroke reaches the actuating point of the limit switch 11, the clamping piston 6 is located by the distance W before its end position in clamping direction. The limit switch 11 is thus properly adjusted. If during the clamping operation the limit switch 11 is actuated, then the clamping jaws have reached a clamping jaw diameter which is equal or smaller $D_1$, that is the permissible smallest diameter of the workpiece to be clamped, and a correct clamping of the workpiece in this position is not assured any longer.

As described above, the method according to the present invention shall also assure that the necessary control signal for operation of the machine is given only when the presence of the necessary pressure on the piston 6 is indicated and when the clamping jaws have reached a clamping diameter which is located between the minimum and the maximum permissible diameter of the workpiece to be clamped. The limit switch 12 has the task to indicate that the clamping jaws have reached a clamping jaw diameter which is equal to or smaller than the permissible maximum diameter $D_2$ of the workpiece to be clamped and the position of the limit switch 12 has to be adjusted such that the same is actuated by the switch plate 8 when the clamping jaws 2 reach, during movement of the piston 6 in clamping direction, at least a diameter which is equal to the maximum permissible diameter $D_2$ of the workpiece to be clamped. If a diameter of the clamping jaws is reached which is equal or smaller than $D_2$, then the proper clamping of the workpiece can be considered assured, as long as the necessary clamping pressure is indicated and the limit switch 11 is not actuated, which would mean that the clamping jaws 2 have reached a position corresponding to a clamping diameter smaller than the smallest permissible workpiece diameter $D_1$. Such a position would mean that the workpiece 1 is not properly clamped. The method according to the present invention will therefore assure that only workpieces with a predetermined diameter within the permissible tolerances is properly clamped. Workpieces having a larger diameter will also be clamped, whereby, however, the limit switch 12 will not be actuated by the switch plate 8 so that no control signal for release of the machine will be produced even if all other conditions are satisfied.

It is also possible that one or a plurality of the clamping jaws 2 do not properly engage the workpiece 1, for instance due to such faulty positioning of a workpiece between the clamping jaws, in which one or a plurality of the latter slip beneath the workpiece. In such a case the limit switch 11 will be surely actuated so that also in this case the control signal for actuating the machine will not be produced.

As mentioned above an additional necessary condition to be ascertained is the presence of a clamping pressure of predetermined magnitude. The pressure in the cylinder space of the clamping cylinder 5 which is actuated by a pressure fluid is checked by a pressure switch 15, the actuation point of which may be adjusted in a known manner. For this purpose testing conduits 13 respectively lead from the two compartments of the cylinder 5 which are located to opposite sides of the piston 6 over a reversible check valve 14, which will assure that the pressure from the pressure compartment into which pressure fluid is admitted is transmitted to the pressure switch 15, whereas the other control conduit is closed.

In summarizing, the following conditions are checked according to the method of the present invention:

By the limit switch 12: whether the first piston position is reached, in which during the clamping operation the clamping jaws 2 reach at least a position corresponding to the maximum permissible diameter $D_2$ of the workpiece to be clamped;

by the limit switch 11: whether the second piston position is not reached, that is the clamping jaw diameter corresponding to the minimum permissible diameter $D_1$ is not reached;

by the pressure switch 15: whether a clamping pressure of a predetermined magnitude is present, that is no defects are present in safety check valves, in the control conduit, the sealing means on the piston or in the conduit feeding pressure fluid into the respective cylinder compartment.

FIGS. 2 and 3 schematically illustrate a wiring diagram to be used in connection with the aforementioned elements.

It is mentioned that the various elements illustrated in the wiring diagram are shown in a non-energized condition.

At the beginning of the clamping operation the switch S will be momentarily closed to energize the relay $d_5$, which in turn closes the holding contact $d_{51}$ of the relay $d_5$, so that the latter remains energized even if the switch S is again opened. The relay $d_5$, when energized, closes the contact 52 and actuates a solenoid operated valve 23, schematically shown in FIG. 1, so that pressure fluid from a pump P is fed into the cylinder compartment above the piston 6, while pressure fluid from the cylinder compartment below the piston 6 is discharged into a tank T, so that the piston 6 moves from an uppermost position in the cylinder 5, in which the clamping jaws 2 are wide open, in clamping direction, that is downwardly, to a clamping position. During such downward movement of the clamping piston 6, the switch plate 8 will reach, during proper function thereof, the limit switch 12 and actuate the same, whereby the contact 12 shown in FIG. 2 is closed and the relay $d_1$ in circuit therewith is energized, since as mentioned above, the contact $d_{52}$ is closed during energizing of the relay $d_5$. Energizing of the relay $d_1$ closes the contact $d_{11}$ shown in FIG. 3, so that the relay $C_1$ is likewise energized. Energizing of the relay $C_1$ causes closing of the holding contact $C_{11}$ of the relay $C_1$ and simultaneously also closing of the contact $C_{12}$. The relay $C_3$ will produce the required control signal when not only the contact $C_{12}$ but also the contact $C_{21}$ is closed. If a workpiece is properly clamped and the necessary clamping pressure is present so that the pressure switch 15 is actuated, the contact 15 shown in FIG. 2 is over the connections 18 and 19 (FIG. 1) closed. Upon closing of the contact 15, the relay $d_2$ is energized and closes thereby the contact $d_{21}$, shown in FIG. 3, whereby the relay $C_2$ is energized. The relay $C_2$, when energized, closes the contact $C_{21}$, shown in FIG. 3, so that the relay $C_3$ is now energized and actuates the necessary control signal.

In order to open the clamping device, the switch L shown in FIG. 2 is closed, thereby energizing the relay $d_4$, which, when energized moves the solenoid operated valve 23 to a position in which a pressure fluid is fed into the cylinder compartment below the piston 6 while pressure fluid in the cylinder compartment above the piston 6 is discharged into the tank T. At the same time the contact $d_{42}$ is opened over the connection 17 (FIG. 1), whereby the relay $C_1$ is deenergized so that the contacts $C_{11}$ and $C_{12}$ are opened, whereby the relay $C_3$ is deenergized and the machine tool, if not prior stopped by other means, is now stopped. Due to the deenergization of the relay $d_4$, the contact $d_{41}$ in FIG. 2 is opened, whereby the relay $d_5$ is likewise deenergized. Deenergization of the relay $d_5$ is a prerequisite for the proper transmission of the command "opening of the clamping device" since otherwise two contradictory commands would be present.

If, for instance, the workpiece 1 is not properly engaged by the clamping jaws 2, then the limit switch 11 will be operated during the clamping stroke, whereby the contact 11 shown in FIG. 2 would be opened and the relay $d_3$ thereby deenergized. When the relay $d_3$ is deenergized then the contact $d_{31}$ shown in FIG. 3 is opened, whereby the relay $C_1$ is deenergized and the holding contact $C_{11}$ is opened together with the contact $C_{12}$, whereby the relay $C_3$ is deenergized and the necessary control signal will not be produced.

It will be understood that each of the elements described above, or two or more together, may also find a useful application in other types of methods for controlling proper clamping of workpieces in a clamping device, differing from the types described above.

While the invention has been illustrated and described as embodied in a method for controlling proper clamping of a workpiece in a clamping device of a machine tool in which the workpiece is to be machined, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for controlling proper clamping of a workpiece in a clamping device having clamping jaws operatively connected to fluid operated cylinder-and-piston means, the piston of which is to be moved in one direction during clamping of the workpiece, comprising the steps of placing a workpiece between the open clamping jaws; feeding pressure fluid into said cylinder-and-piston means to move the piston thereof in said one direction; sensing whether the piston during movement in said one direction reaches at least one first piston position but not a second piston position spaced in said one direction from said first position; simultaneously sensing the presence of a predetermined fluid pressure acting on the piston; and producing a control signal indicating proper clamping of the workpiece when the piston in its final clamping position has at least reached said first position but not reached said second position while said predetermined fluid pressure is present in said clamping position.

2. A method as defined in claim 1, wherein said piston has a predetermined total stroke, and wherein said first piston position is sensed at a position the piston reaches during its movement in clamping direction about half of the total stroke, and wherein the non-reaching of the second position is sensed at a distance from said first position which corresponds to the movement of the clamping jaws equal to half the permissible diameter difference of the workpiece to be clamped.

3. A method as defined in claim 1, wherein the point of sensing said second position the piston should not reach during its movement in clamping direction is spaced a very short distance from an end position the piston may reach in the absence of a workpiece during movement thereof in said one direction, and wherein said first piston position is sensed at a distance from said second piston position which corresponds to a movement of the clamping jaws equal to half the permissible diameter difference of the workpiece to be clamped.

4. A method as defined in claim 1, wherein the presence of the predetermined fluid pressure in said clamping position of the piston is sensed by a pressure switch.

5. A method as defined in claim 4, and including the step of providing a member outside the cylinder-and-piston means and operatively connected to the piston for movement therewith and sensing said first and said second piston position by switches spaced in said one direction from each other and cooperating with said member.

6. A method as defined in claim 5, wherein said signal is produced by relays connected in circuit with said pressure switch and said switches.

* * * * *